United States Patent
Schwab

(10) Patent No.: US 8,057,081 B2
(45) Date of Patent: Nov. 15, 2011

(54) LIGHT GUIDE FOR VEHICLE LAMP ASSEMBLY

(75) Inventor: Leo F. Schwab, Fraser, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 418 days.

(21) Appl. No.: 12/369,064

(22) Filed: Feb. 11, 2009

(65) Prior Publication Data

US 2010/0202153 A1 Aug. 12, 2010

(51) Int. Cl.
*F21S 8/10* (2006.01)

(52) U.S. Cl. ........................ 362/511; 362/545

(58) Field of Classification Search .................. 362/511, 362/541, 542, 545, 555
See application file for complete search history.

(56) References Cited

U.S. PATENT DOCUMENTS

| | | | |
|---|---|---|---|
| 4,422,719 A | 12/1983 | Orcutt | |
| 5,432,876 A * | 7/1995 | Appeldorn et al. | 362/556 |
| 5,772,304 A | 6/1998 | Smith | |
| 5,931,576 A | 8/1999 | Kreysar et al. | |
| 6,305,813 B1 | 10/2001 | Lekson et al. | |
| 7,097,336 B2 | 8/2006 | Lin | |
| 2008/0310187 A1 * | 12/2008 | Huang | 362/615 |

FOREIGN PATENT DOCUMENTS

| | | |
|---|---|---|
| DE | 102004046386 A1 | 4/2006 |
| DE | 102007010023 A1 | 9/2007 |
| DE | 102006037797 A1 | 2/2008 |
| EP | 1890077 A1 | 2/2008 |

* cited by examiner

*Primary Examiner* — David V Bruce
(74) *Attorney, Agent, or Firm* — Quinn Law Group, PLLC

(57) ABSTRACT

A light guide and various vehicular lamp assemblies using the same are presented herein. In one embodiment, the lamp assembly includes a light source, such as an LED module. A light coupler is operable to receive light from the light source, and distribute the light in a first direction. The light guide includes an elongated, curvilinear body with first and second longitudinal end faces, and opposing light-emitting and light-guiding surfaces extending between the two end faces on a respective side of the body. The first end face communicates with the light coupler to receive light therefrom. The light guide body transmits light generated by the light source along the longitudinal expanse thereof. The light-guiding surface includes an array of longitudinally-spaced optical grooves configured to refract light generated by the light source in a second direction. The depth of preselected optical grooves is varied along the length of the light guide.

19 Claims, 4 Drawing Sheets

LIGHT GUIDE FOR VEHICLE LAMP ASSEMBLY

TECHNICAL FIELD

The present invention relates generally to lamp assemblies for motorized vehicles, and more specifically to light guides for use in vehicular lamp assemblies.

BACKGROUND OF THE INVENTION

Current production motorized vehicles, such as the modern-day automobile, are originally equipped with a lighting system to provide interior and exterior illumination for the vehicle operator. Such lighting systems include an array of lamp assemblies that are mounted or integrated to the front, sides and rear of the vehicle. The purpose of these lamp assemblies is to provide exterior illumination for the driver to safely operate the vehicle in low-light conditions, such as nighttime driving, and to increase the conspicuity of the vehicle. Such lighting systems also display information about the vehicle's presence, position, size, direction of travel, as well as providing signaling functions to indicate the operator's intended maneuvering of the vehicle.

All automobiles must be equipped with rear brake lights that illuminate upon actuation of the vehicle brake system to indicate that the vehicle is slowing or stopping. Generally fitted in multiples of two, symmetrically at the left and right edges of the vehicle rear, the brake lights are red, steady-burning lamps that are activated when the driver applies pressure to the brake pedal. Many automobiles are also equipped with a central brake lamp that is mounted higher than the vehicle's traditional left and right brake lamps. The central brake lamp is known as a center high-mounted stop lamp, or "CHMSL" (pronounced chim-zul). The CHMSL is intended to provide a deceleration warning to following drivers whose view of the vehicle's regular stop lamps is blocked by interceding vehicles.

In addition to the above-mentioned brake light assemblies, current production automobiles are also equipped with front-mounted headlamps. With a similar arrangement to the rear brake lights, an individual headlamp assembly is typically mounted at both the front-left and front-right corners of the vehicle. The headlamp is generally designed to provide forward illumination in two different settings: a "low-beam setting, which provides adequate forward and lateral illumination for normal driving conditions with minimized glare, and a "high-beam" setting, which provides an intense, center-weighted distribution of light that is primarily suitable for driving scenarios where on-coming drivers are not present.

Headlamp assemblies, in addition to forward illumination, may include multiple lamps to provide various features. Daytime running lamps, also known as daylight running lamps (or "DRL" for short), are provided to increase the conspicuity of the vehicle during daylight conditions. DRLs automatically switch on when the vehicle is shifted into drive. These may be functionally-dedicated lamps incorporated into the vehicle design, or may be provided, for example, by the low- or high-beam headlamps. Similarly, nighttime standing-vehicle conspicuity to the front is provided by white or amber light emitted from front position lamps, more commonly known as "parking lamps".

Conventional lamp assemblies include numerous internal parts, such as brackets, reflectors, bulbs, internal adjuster mechanisms, and, in some cases, a projector lamp. Traditionally, the entire lamp assembly is pre-assembled into a protective lamp housing prior to integration with the vehicle. A protective outer lens is also necessary to shield the internal lamp componentry from external debris, weather, and the like. The complexity of such prior art lamp assemblies adds to the cost of manufacturing the assembly, which in turn adds to the cost of the automobile.

More recently, some vehicular lamp assemblies have replaced the traditional filament-type light bulb with a number of light emitting diodes (LEDs). LEDs offer certain advantages over their conventional bulb counterparts, including reduced power consumption, improved shock resistance, minimal heat generation, and a longer operational life expectancy. Individually, though, an LED does not have sufficient luminous output to replace other lamp formats (e.g., incandescent, tungsten halogen, fluorescent, and high intensity discharge). As a result, the LEDs in prior art lamp assemblies are normally grouped into strings or clusters to accumulate sufficient light output. In addition, the light emitted by such LED clusters generally diverges into an uncontrolled light spread distribution, which is unsuitable for certain lamp configurations, such as DRLs and turn signals.

SUMMARY OF THE INVENTION

The present invention discloses a new and novel light guide configuration, and a variety of vehicular lamp assemblies using the same. The lamp assemblies of the present invention offer significant advantages over prior art lamp assemblies. In one such example, the simpler lamp designs described herein offer more controlled light dispersion and more robust thermal management for the light source. In addition, the use of an LED light source significantly reduces power consumption (e.g., on the order of 14 watts) over conventional bulb solutions. Finally, because there are fewer components required by the lamp assemblies of this invention, overall vehicle cost is reduced, and warranty costs associated with general maintenance are minimized.

Additional benefits offered by the present invention include significant styling advantages. By reducing the total number of parts, and eliminating previously required reflectors, the lamp assemblies presented herein can be designed narrower than their traditional prior art counterparts. Moreover, the light guide technology of this invention provides the ability to implement a unique signature light appearance brand character for different vehicle platforms. The lamp assemblies disclosed herein are also significantly smaller than traditional headlamp and tail lamp assemblies, freeing up otherwise scarce and valuable packaging space.

In accordance with one embodiment of the present invention, a light guide for a vehicular lamp assembly is provided. The lamp assembly is operable to function as a daylight running lamp (DRL), a position parking lamp, a turn signal lamp, or all three. The lamp assembly includes a light source that is operable to generate light, such as an optical fiber light device, a tubular light source, an incandescent lamp, but preferably a light emitting diode (LED) module. A light coupler is in operative communication with the light source to receive light therefrom and distribute the light in a first direction. The light guide has an elongated body with first and second faces each positioned at a respective longitudinal end thereof. Opposing light-emitting and light-guiding surfaces extend between the first and second faces, each oriented on a respective side of the body. The light guide body may be fabricated from various suitable materials, including acrylic, polycarbonate, plastic, and glass.

The first end face of the light guide body is configured to communicate with the light coupler, and receive light therefrom. The body is configured to transmit light generated by the light source along the longitudinal expanse thereof. The light-guiding surface includes an array of longitudinally-spaced optical grooves. Each optical groove is configured to refract light generated by the light source in a direction different from the first direction. The light-emitting surface is configured to emanate the refracted light. The depth of preselected optical grooves is varied along the longitudinal length of the light guide. For instance, in this embodiment, the array of optical grooves includes first and second optical grooves, the first optical groove having a first depth, and the second optical groove having a second depth that is larger than the first depth. This allows for more intense light output, and the ability to control (i.e., "aim") the light spread distribution.

According to one aspect of this particular embodiment, the groove pitch—i.e., the distance between the individual optical grooves, is varied along the longitudinal length of the light guide. By way of example, the array of optical grooves further includes a third optical groove. The first optical groove is spaced from the second optical groove a first distance, and the second optical groove is spaced from the third optical groove a second distance less than the first distance. The third optical groove may have a third depth that is larger than the first and second depths.

As part of another aspect of this particular embodiment, the refraction angle of preselected optical grooves may be modified, thereby controlling the light spread distribution. In one instance, the first optical groove has a first refracting surface oriented with respect to the light-emitting surface at a first angle, whereas the second optical groove has a second refracting surface oriented with respect to the light-emitting surface at a second angle different from the first angle.

In accordance with an additional facet of this embodiment, the light guide includes one or more masking wings attached to the light guide body. In one example, the light guide includes first and second masking wings, each of which is integrally formed with the body, projecting from a respective side thereof. Each masking wing is configured to conceal at least one side of optical grooves. Ideally, each masking wing includes opposing inner and outer surfaces, wherein at least one of these surfaces has a granulated finish.

In an alternative facet, the light guide includes a bezel with a support platform portion and at least one flange portion extending therefrom. The support platform portion is configured (i.e., shaped and sized) to receive and retain the light guide body therein. Each flange portion is configured to conceal at least one side of the optical grooves. The bezel may include first and second flanges, each of which projects from a respective side of the support platform portion, generally orthogonally oriented relative to the light-guiding surface.

According to another alternative aspect, the light guide includes a generally transparent lens which defines a light guide pocket configured to receive and retain at least a portion of the light guide body therein. In this instance, the light guide also includes a bezel with first and second substantially opaque flange portions that collectively define a lens slot configured to receive and retain the lens therein. Each flange portion is configured to conceal a respective side of the array of optical grooves.

According to another embodiment of the present invention, a headlamp assembly for a motorized vehicle is provided. The headlamp assembly includes a light emitting diode (LED) module having a module body configured to mount to the front vehicle structure, and at least one LED housed within the module body. A light coupler is mounted adjacent to the LED module, and configured to receive light generated by the LED and distribute the light in a first direction.

The headlamp also includes a light guide having an elongated, curvilinear body with first and second longitudinal end faces. Opposing light-emitting and light-guiding surfaces extend between the two end faces, each located on a respective lateral side of the body. The light guide is mounted such that the first face is adjacent the light coupler to receive light therefrom. The light guide body is configured to transmit light generated by the light source along the longitudinal expanse of the body from the first face toward the second face. The light-guiding surface includes an array of longitudinally-spaced optical grooves, each of which is configured to refract light generated by the LED in a new direction. The light-emitting surface is configured to emanate the refracted light. The array of optical grooves includes at least three optical grooves: the first optical groove being spaced from the second optical groove a first distance, and the second optical groove being spaced from the third optical groove a second distance less than the first distance.

In accordance with one facet of this specific embodiment, the first optical groove has a first depth, the second optical groove has a second depth that is larger than the first depth, and the third optical groove has a third depth that is larger than both the first and second depths.

In accordance with another facet, the light guide body includes first and second integrally formed masking wings. Each masking wing projects from a respective side of the body, generally orthogonally oriented relative to the light-guiding surface. The masking wings are configured to conceal the laterally-inboard and laterally-outboard sides of the optical grooves. Alternatively, the lamp assembly can be designed with a metalized bezel. The bezel has a support platform portion and at one or more flange portions each extending from one side thereof. The support platform portion is configured to receive and retain the light guide body therein. The flange portions are configured to conceal the laterally-inboard and laterally-outboard sides of the optical grooves.

In accordance with yet another facet, the headlamp assembly includes a generally transparent lens with a light guide pocket configured to receive and retain at least a portion of the light guide body therein. A bezel with first and second substantially opaque flange portions that collectively define a lens slot is configured to receive and retain the lens therein. The first and second flange portions are each configured to conceal one side of the array of optical grooves.

In accordance with even yet another facet, the LED module and light guide cooperate to function as a daylight running lamp (DRL), a position parking lamp, and a turn signal lamp. To function as a DRL, the LED module includes a bright white LED that is automatically activated when the vehicle is turned on. In order to offer the position parking function, the LED module incorporates electronic hardware which selectively reduces power output to the white LED, thereby reducing the brightness of the white LED, when the vehicle park lamps are illuminated. The turn signal function is provided by integrating an amber or yellow LED into the LED module that is illuminated when the operator activates a turn signal lever or similar actuating device.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
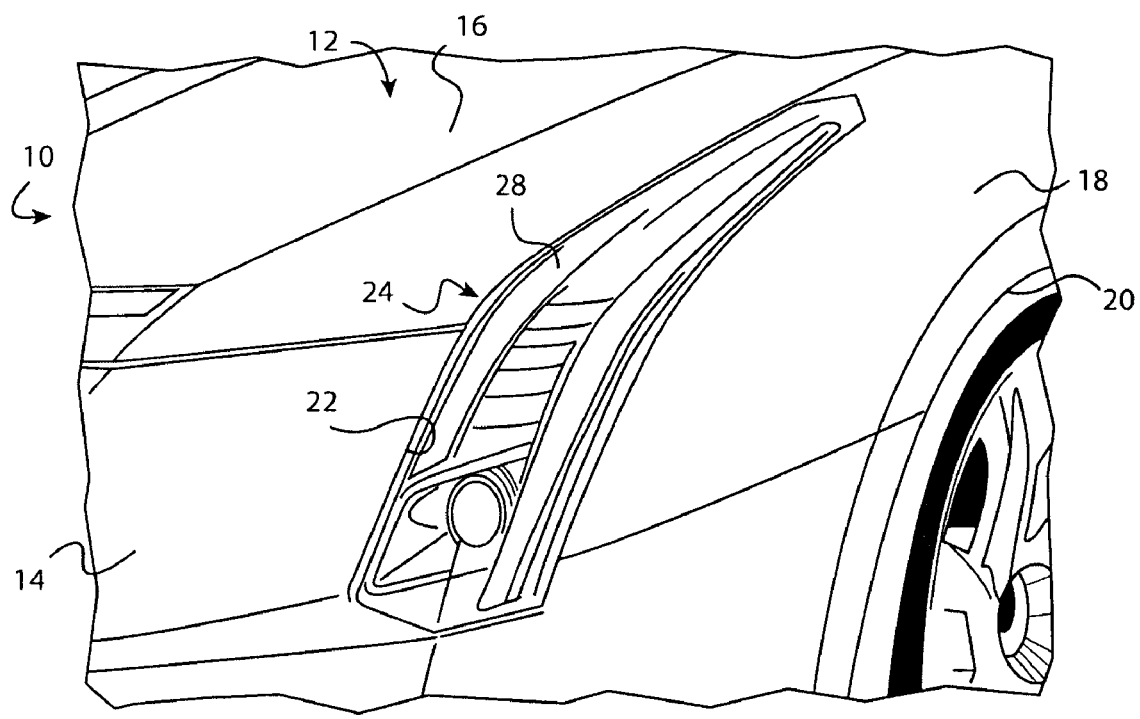
FIG. 1 is a perspective-view illustration of the front portion of an exemplary motorized vehicle with a vehicular lamp assembly in accordance with one embodiment of the present invention integrated thereto.

Referring to the drawings, wherein like reference numbers refer to like components throughout the several views, FIG. 1 is a perspective-view illustration of a representative motorized vehicle, identified generally as 10, with which the present invention may be incorporated and practiced. It should be readily understood that FIG. 1 is merely an exemplary application by which the present invention may be utilized. As such, the present invention is by no means limited to the vehicle configuration shown in FIG. 1. For instance, although the vehicle 10 is depicted in FIG. 1 as a standard passenger car, the present invention can be incorporated into any motorized vehicle platform, such as, but certainly not limited to, light trucks, sport utility vehicles (SUVs), heavy duty vehicles, minivans, conversion vans, buses, boats, trains, airplanes, etc. Finally, the drawings presented herein are not to scale, and are provided purely for instructional purposes. Thus, the individual and relative dimensions and orientations shown in the drawings are not to be considered limiting.

The vehicle 10 has a vehicle body with front vehicle structure, designated generally at 12, which is adjacent to and forward of rear vehicle structure (not visible in the view provided). The front vehicle structure 12 is represented herein, in part, by a front fascia 14, which extends transversely across the forward most portion of the vehicle 10, and covers or conceals, among other things, an energy absorbing bumper substructure (not visible). The front fascia 14 is forward of a movable hood assembly 16 which spans over and covers a forward "engine" compartment (not visible with the hood assembly 16 in the closed position seen in FIG. 1).

The front fascia 14 cooperates with left- and right-hand front fenders 18 (only one of which is visible in FIG. 1, but an identical mirror-image counterpart is mounted on the other side of the vehicle) to define the peripheral contour of a front-left and a front-right wheel well, one of which is designated at 20. The front fascia 14 also cooperates with the front fenders 18 and hood assembly 16 to define the peripheral contour of front-left and front-right lamp wells, only one being illustrated in FIG. 1 and designated 22. Packaged within each lamp well 22 is a corresponding vehicular lamp assembly 24 (only the left-hand assembly is evident in FIG. 1, but a mirror-image, right-hand counterpart is also present in this particular embodiment). The vehicle 10 also includes many conventional vehicular components, such as suspension, powertrain, driveline, brake system, steering, and body components, that are well known in the art. These structures are not necessarily a part of the inventive subject matter of this invention and, thus, will not be illustrated or discussed in detail herein.

Figure 2:
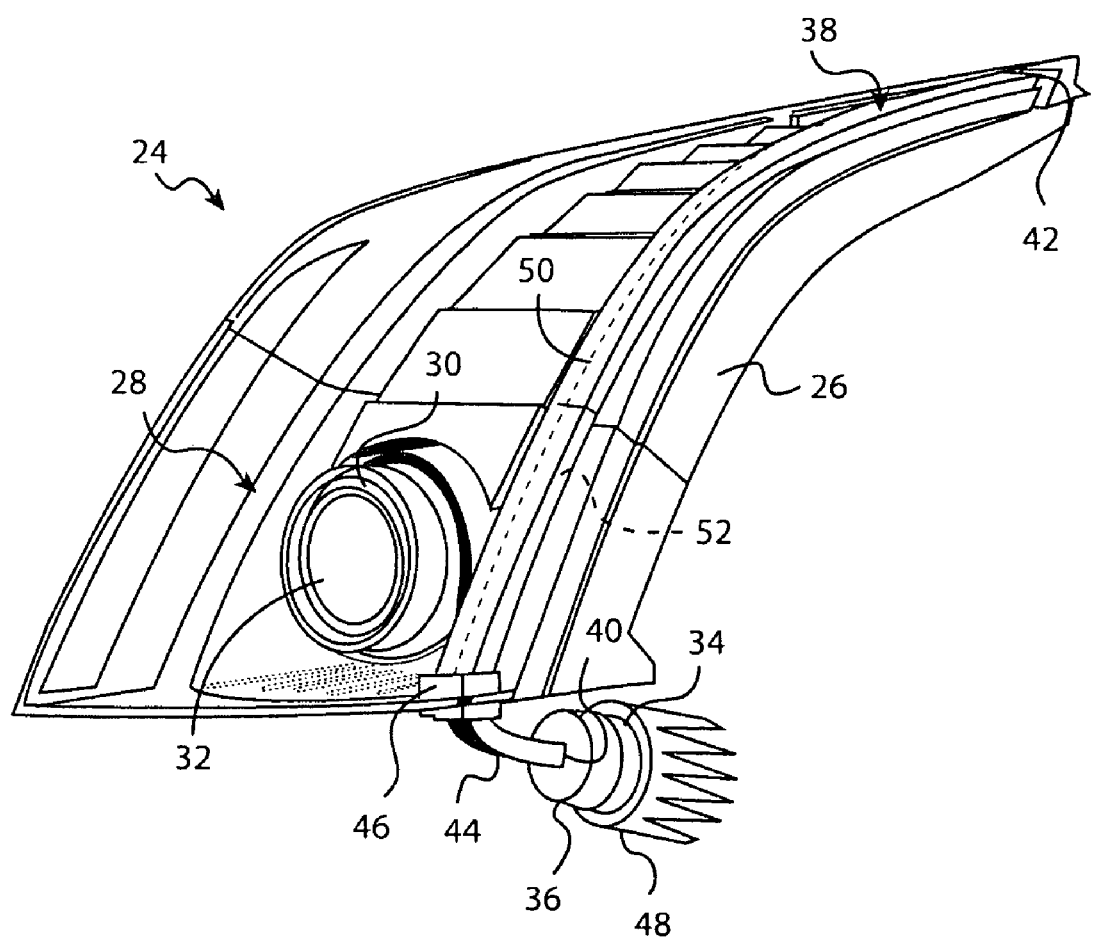
FIG. 2 is a schematic, perspective-view illustration of the vehicular lamp assembly of FIG. 1.

Turning to FIG. 2, the vehicular lamp assembly 24 is schematically illustrated in accordance with one embodiment of the present invention. In the exemplary embodiment presented in FIGS. 1 and 2, the vehicle lamp assembly 24 is depicted as a front-mounted headlamp assembly. It should be recognized, however, that the novel and inventive aspects of the present invention may be incorporated and applied to other lamp assembly configurations, including, but not limited to, rear taillight assemblies (not shown), without departing from the scope and spirit of the present invention.

The lamp assembly 24 includes a lamp housing 26, and a transparent or translucent protective outer lens 28 (FIG. 1) mounted to the housing 26. A conventional forward-illuminating, high-beam/low-beam lamp, designated generally as 28, is encased within the lamp housing 26. The lamp 28 comprises the usual projector body 30, the open end of which is closed by a projector lens 32. A replaceable bulb (not visible) is carried by the projector body 30, and is connected through conventional means to a wiring harness (not shown) of the vehicle 10. The lamp housing 26, which can be made of a plastic material, is designed to fit within the lamp well 22. The housing 26 includes a plurality of attachments (e.g., snap fasteners, mounting tabs, threaded bolt cavities, etc.) at which the lamp assembly 24 is mounted to the rest of the vehicle structure 12.

With continuing reference to FIG. 2, the lamp assembly 24 is also provided with a second light source that is operable to generate light. Recognizably, the light source may take on various configurations, such as an optical fiber light device, a tubular light source, or an incandescent lamp, but in the embodiment of FIGS. 1 and 2, the light source is a light emitting diode (LED) module 34. The LED module 34 houses an electric circuit board (not specifically called out or described herein) and other internal electric componentry typical to LEDs. The LED module body is configured to mount to lamp housing 26, and may incorporate a heat sink 48. An electrical terminal (not visible), which protrudes from a rear face of the LED module body 34, is adapted to receive an electrical connector (not shown) from a wiring harness to provide electric communication between the LED module 34 and the vehicle electrical system.

One or more light emitting diodes are operatively oriented along a forward surface of the LED module 34. Each LED is a semiconductor device, made from a known semiconductor material, such as aluminum gallium arsenide, that emits light when an electric current is applied thereto. Notably, the number and orientation of the LEDs may vary to suit the intended purpose of the lighting arrangement discussed herein. Moreover, the size and geometry of the LED module 34 may be varied to meet the particular packaging and design requirements of the intended application of the LED module 34.

An optical light coupler 36 is placed in operative communication with the LED module 34 to receive light therefrom. In the exemplary embodiment shown, the optical coupler 36 is mounted in abutting relation to the forward face of the LED module 34, adjacent to and preferably covering the various LEDs. The optical coupler 36 has an input side that is designed to collect light generated by the LEDs, and an output side that distributes the light in a first direction (e.g., D1 of FIG. 3). In general, the optical coupler 36 is configured to transform the spatial light pattern provided by the light source into a colluminated light pattern that is optimum for the light guide 38.

In accordance with the present invention, the vehicle lamp assembly 24 includes a light guide (also known as a "light pipe") 38. The light guide 38 has an elongated, curvilinear body 38 with first and second end faces 40 and 42, respectively, each positioned at a respective longitudinal end of the light guide body 38. The light guide body 38, which is predominantly arranged within the lamp housing 26, has an arcuate tail-end 44 that passes through a bezel 46 within the housing 26, into operative engagement with the light coupler 36. Opposing light-emitting and light-guiding surfaces 50 and 52, respectively, which are both discussed in extensive detail hereinbelow, extend between the first and second end faces 40, 42. In this embodiment, the light-emitting surface 50 is oriented on the forward-most side of the light guide body 38 relative to the vehicle 10. In contrast, the light-guiding surface 52 is oriented along the rearward-most side of the light guide body 38 relative to the vehicle 10.

The light guide 38 is packaged such that the first end face 40 of the light guide body 38 is adjacent the light coupler 36, preferably pressing against the output side of the light coupler 36, to receive light therefrom. The light guide body 38 is configured to capture the light generated by the LED module 34 and passed through the light coupler 36, and transmit the light along the longitudinal expanse of the light guide body 38 from the first face 40 toward the second face 42. In other words, the light guide 38 is fabricated from a material that can transmit light generated by the LEDs to preselected locations along the forward vehicle structure 12 (FIG. 1), and diffuse the light in preselected amounts and predetermined directions across the length of the light guide body 38. Such materials may include, but are certainly not limited to, polycarbonate, polymethylmethacrylate, polyethylene terephthalate, acrylic, glass, and combinations thereof. The dimensions, geometry, and orientation of the light guide body 38 and its constituent portions may be customized to address the requirements of a particular vehicle application without departing from the scope of the present invention.

Figure 3:
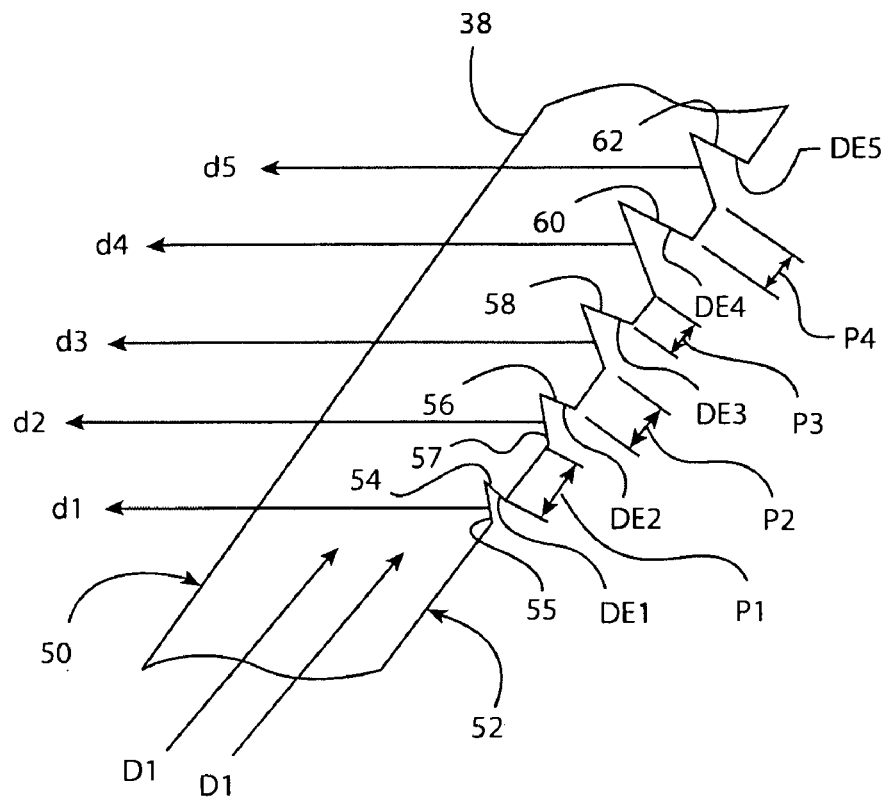
FIG. 3 is a schematic, side-view illustration of the light guide from FIG. 1 depicting the transmission and refraction of light by the light guide.

Turning then to FIG. 3, the light-guiding surface 52 includes an array of longitudinally-spaced optical grooves, represented herein for explanatory purposed by five optical grooves: first, second, third, fourth and fifth grooves 54, 56, 58, 60 and 62, respectively. The order of the grooves as presented in FIG. 3 is not to be regarded as limiting. That is, in referring to the first, second, third, fourth, and fifth grooves in this description and in the claims, these elements may be counted "first" to "fifth" in any order in the drawings (e.g., top to bottom, bottom to top, etc.).

Each optical groove is configured to refract light generated by the light source in a direction different from the first direction D1; in FIG. 3, the direction of refraction for each groove being respectively designated as d1, d2, d3, d4 and d5. The refraction angle of the optical grooves may be identical or individually modified to control the light spread distribution. For instance, the first optical groove 54 has a first refracting surface 55 that may be oriented with respect to the light-emitting surface 50 at a first angle A1. In a similar respect, the second optical groove 56 has a second refracting surface 57 oriented with respect to the light-emitting surface 50 at a second angle A2. The second angle A2 may be the same as or different from the first angle A1 depending upon the preferred light dispersion pattern for the lamp assembly 24. The light-emitting surface 50 emanates the light refracted by the optical grooves.

Similar to the refraction angle discussed above, the depth of the individual optical grooves may be varied along the longitudinal length of the light guide 38. For instance, the first optical groove 54 has a first depth DE1, the second optical groove has a second depth DE2, the third optical groove has a third depth DE3, the fourth optical groove has a fourth depth DE4, and the fifth optical groove has a fifth depth DE5. In the embodiment of FIG. 3, the second depth DE2 is greater than the first depth DE1, the third depth DE3 is greater than the second depth DE2, the fourth depth DE4 is greater than the third depth DE3, and the fifth depth DE5 is less than the fourth depth DE4, equal to the third depth DE3, and greater than the second depth DE2. This configuration allows for more intense light output, and the ability to control (i.e., "aim") the light spread distribution.

According to another aspect of this embodiment, the groove pitch—i.e., the distance between the individual optical grooves, may be varied along the longitudinal length of the light guide 38 to further modify the light spread distribution emanated through the light-emitting surface 50. For example, the first optical groove 54 is spaced from the second optical groove 56 a first distance P1, and the second optical groove 56 is spaced from the third optical groove 58 a second distance P2, which may be less than the first distance P1. Furthermore, the third optical groove 58 is spaced from the fourth optical groove 60 a third distance P3, which may be less than the first and second distances P1, P2. Finally, the fourth optical groove 60 is spaced from the fifth optical groove 62 a fourth distance P4, which may be greater than the third distance P3, equal to the second distance P2, and less than the first distance P1.

The LED module 34 and light guide 38 cooperate to provide three lamp functions: a daylight running lamp (DRL) function, a position or park lamp function, and a turn signal lamp function. To function as a DRL, the LED module 34 includes a bright white LED that is automatically activated when the vehicle 10 is turned on in the daytime. In order to offer the position or park lamp function, the LED module 34 incorporates certain electronic hardware which selectively reduces power output to the white LED, thereby reducing the brightness of the white LED, when the vehicle park lamps are illuminated. Lastly, the turn signal function is provided by integrating an amber or yellow LED into the LED module 34 that is illuminated when the operator activates a turn signal lever or similar actuating device.

Figure 4:
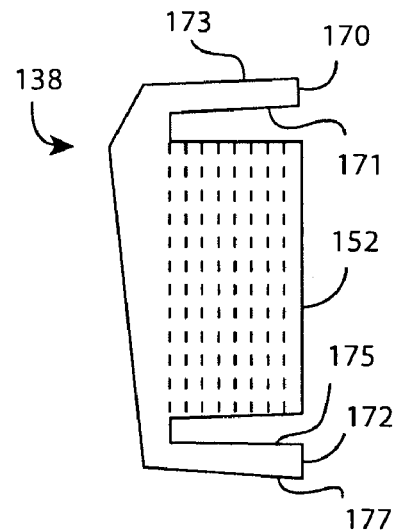
FIG. 4 is a schematic, cross-sectional, plan-view illustration of a light guide in accordance with one embodiment of the present invention.
Figure 5:
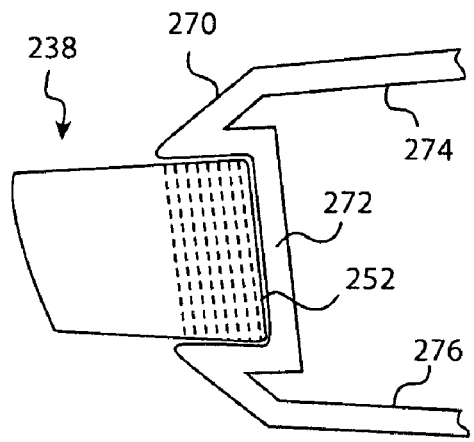
FIG. 5 is a schematic, cross-sectional, plan-view illustration of a light guide with a support bezel in accordance with another embodiment of the present invention.
Figure 6:
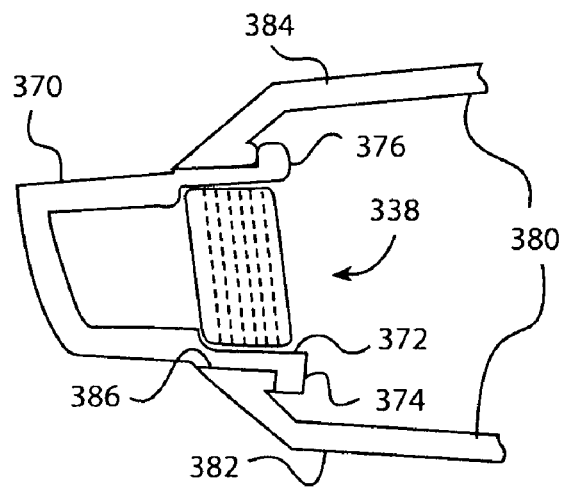
FIG. 6 is a schematic, cross-sectional, plan-view illustration of a light guide with an outer lens and a support bezel in accordance with yet another embodiment of the present invention.

FIGS. 4-6 illustrate additional light guide configurations in accordance with the present invention. The light guide 138 illustrated in FIG. 4, functions in a manner synonymous to the light guide 38, described hereinabove with respect to FIGS. 1-3. In this particular arrangement, however, the light guide 138 includes first and second masking wings 170 and 172, respectively. Each masking wing 170, 172 is operatively attached to the light guide body 138. In this embodiment, the masking wings 170, 172 are integrally formed with the body 138, each projecting from a respective lateral side thereof, generally orthogonally oriented relative to the light-guiding surface 152.

Each masking wing 170, 172 is configured to conceal at least one side of the optical grooves. According to FIG. 4, the first masking wing 170 conceals the laterally-inboard side of the light guide 38, whereas the second masking wing 172 conceals the laterally-outboard side. The first masking wing 170 wing includes opposing inner and outer surfaces 171 and 173, respectively. Likewise, the second masking wing 172 includes opposing inner and outer surfaces 175 and 177, respectively. One manner of concealing the optical grooves is by providing the inner surface, the outer surface, or both, of each masking wing with a granulated finish.

With reference to FIG. 5, the light guide 238 of this particular embodiment is designed to include a bezel 270. The bezel 270 includes a support platform portion 272 with first and second flange portions 274 and 276, respectively, which extend from the support platform portion 272, generally orthogonally oriented relative to the light-guiding surface 252. The support platform portion 272 is configured (i.e., shaped and sized) to receive and retain at least a portion of the light guide body 238 therein. To this regard, the bezel 270 may be employed to secure the light guide 238 to the vehicle 10 (FIG. 1). Each flange portion 274, 276 is of sufficient width to conceal at least one side of the aforementioned optical grooves. To this regard, the bezel 270 is preferably fabricated from a substantially opaque material, such as aluminized plastic. The light guide 238 illustrated of FIG. 5 functions in a manner synonymous to the light guide 38 and 138 of FIGS. 3 and 4, respectively.

Turning then to FIG. 6, the light guide 338 includes a generally-transparent protective lens 370 and a bezel 380. The lens 370 defines a light guide pocket 372 configured to receive and retain at least a portion of the light guide body 338 therein. For example, the light guide pocket 372 may be fabricated as an elongated channel that is designed to complement the shape and dimensions of the light guide body 338. An adhesive may then be used to secure the light guide 338 to the lens 370.

Similar to the embodiment of FIG. 5, the arrangement of FIG. 6 also includes a bezel 380 with first and second substantially opaque flange portions 382 and 384, respectively. The first and second flange portions 382, 384 collectively define a lens slot 386 that is configured to receive and retain the lens 370 therein. In the exemplary configuration shown in FIG. 6, the lens 370 includes first and second legs 374 and 376, respectively. The legs 374, 376 press-fit into the lens slot 386, and lock the lens 370 to the bezel 384. Each flange portion 382, 384 is configured to conceal a respective side of the array of optical grooves. The lens 370 may also contain optical facets on its inside or outside surfaces to direct the light to preselected location way from the vehicle 10.

While the best modes for carrying out the invention have been described in detail, those familiar with the art to which this invention relates will recognize various alternative designs and embodiments for practicing the invention within the scope of the appended claims.

The invention claimed is:

1. A light guide for a vehicular lamp assembly having a light source operable to generate light, and a light coupler in operative communication with the light source to receive light therefrom and distribute the light in a first direction, the light guide comprising:
    an elongated body with first and second faces each at a respective longitudinal end thereof, and opposing light-emitting and light-guiding surfaces each extending between said first and second faces on a respective side of said body, said first face configured to communicate with the light coupler and receive light therefrom, said body configured to transmit light generated by the light source along the longitudinal expanse of said body, said light-guiding surface including an array of longitudinally-spaced optical grooves each configured to refract light generated by the light source in a second direction, and said light-emitting surface configured to emanate the refracted light;
    wherein said array of optical grooves includes first and second optical grooves, said first optical groove having a first depth and said second optical groove having a second depth larger than said first depth; and
    wherein said first optical groove has a first refracting surface oriented with respect to said light-emitting surface at a first angle, and said second optical groove has a second refracting surface oriented with respect to said light-emitting surface at a second angle different from said first angle.

2. The light guide of claim 1, wherein said array of optical grooves further includes a third optical groove, and wherein said first optical groove is spaced from said second optical groove a first distance, and said second optical groove is spaced from said third optical groove a second distance less than said first distance.

3. The light guide of claim 2, wherein said third optical groove has a third depth larger than said first and second depths.

4. The light guide of claim 1, further comprising:
    at least one masking wing operatively attached to said light guide body and configured to conceal at least one side of said array of optical grooves.

5. The light guide of claim 4, wherein said at least one masking wing includes first and second masking wings each integrally formed with said body and projecting from a respective side thereof.

6. The light guide of claim 4, wherein said at least one masking wing includes opposing inner and outer surfaces, at least one of said inner and outer surfaces having a granulated finish.

7. The light guide of claim 1, further comprising:
    a bezel with a support platform portion and at least one flange portion extending from said support platform portion, said support platform portion configured to receive and retain therein said light guide body, and said at least one flange portion configured to conceal at least one side of said array of optical grooves.

8. The light guide of claim 7, wherein said at least one flange portion includes first and second flanges each projecting from a respective side of said support platform portion and generally orthogonally oriented relative to said light-guiding surface.

9. The light guide of claim 1, further comprising:
    a generally transparent lens defining a light guide pocket configured to receive and retain at least a portion of said light guide body therein; and
    a bezel with first and second substantially opaque flange portions collectively defining a lens slot configured to receive and retain therein said lens, said first and second flange portions each being configured to conceal at one side of said array of optical grooves.

10. The light guide of claim 1, wherein the lamp assembly is at least one of a daylight running lamp (DRL), a position or park lamp, and a turn signal lamp.

11. The light guide of claim 1, wherein the light source is one of a light emitting diode (LED), an optical fiber light device, a tubular light source, and an incandescent lamp.

12. A headlamp assembly for a motorized vehicle having opposing front and rear vehicle structure, the headlamp assembly comprising:
    a light emitting diode (LED) module having a module body configured to mount to the front vehicle structure, and at least one LED housed in said module body;
    a light coupler adjacent said LED module and configured to receive light generated by said LED and distribute the light in a first direction; and
    a light guide having an elongated curvilinear body with first and second faces each at a respective longitudinal end thereof, and opposing light-emitting and light-guiding surfaces extending between said first and second faces each on a respective lateral side of said body, said first face being adjacent said light coupler and configured to receive light therefrom, said body configured to transmit light generated by the light source along the longitudinal expanse of said body from said first face toward said second face, said light-guiding surface including an array of longitudinally-spaced optical grooves each configured to refract light generated by said LED in a second direction, and said light-emitting surface configured to emanate the refracted light;

wherein said array of optical grooves includes first, second and third optical grooves, said first optical groove being spaced from said second optical groove a first distance, and said second optical groove being spaced from said third optical groove a second distance less than said first distance.

13. The headlamp assembly of claim 12, wherein said first optical groove has a first depth, said second optical groove has a second depth larger than said first depth, and said third optical groove has a third depth larger than said first and second depths.

14. The headlamp assembly of claim 12, wherein said light guide body includes first and second integrally formed masking wings each projecting from a respective side of said body generally orthogonally oriented relative to said light-guiding surface and configured to conceal at least one side of said array of optical grooves.

15. The headlamp assembly of claim 12, further comprising:
a bezel with a support platform portion and at least one flange portion extending from one side of said support platform portion, said support platform portion configured to receive and retain therein said light guide body, and said at least one flange portion configured to conceal at least one side of said array of optical grooves.

16. The headlamp assembly of claim 12, further comprising:
a generally transparent lens defining a light guide pocket configured to receive and retain at least a portion of said light guide body therein; and
a bezel with first and second substantially opaque flange portions collectively defining a lens slot configured to receive and retain therein said lens, said first and second flange portions each being configured to conceal at one side of said array of optical grooves.

17. The headlamp assembly of claim 12, wherein said first optical groove has a first refracting surface oriented with respect to said light-emitting surface at a first angle, and said second optical groove has a second refracting surface oriented with respect to said light-emitting surface at a second angle different from said first angle.

18. The headlamp assembly of claim 12, wherein said LED module and said light guide cooperate to function as a daylight running lamp (DRL), a position or park lamp, and a turn signal lamp.

19. A motorized vehicle, comprising:
a vehicle body having a front end opposing a rear end;
a light emitting diode (LED) module having a module body mounted to one of said front and rear vehicle ends, and at least one LED housed within said module body;
a light coupler mounted to said vehicle body adjacent said LED module and configured to receive light generated by said LED and distribute the light in a first direction; and
a light guide having an elongated curvilinear body with first and second faces each at a respective longitudinal end thereof, and opposing light-emitting and light-guiding surfaces extending between said first and second faces each on a respective side of said body, said first face being adjacent said light coupler and configured to receive light therefrom, said body configured to transmit light generated by the light source along the longitudinal expanse of said body from said first face toward said second face, said light-guiding surface including an array of longitudinally-spaced optical grooves each configured to refract light generated by said LED in a second direction, and said light-emitting surface configured to emanate the refracted light;
wherein said array of optical grooves includes first, second and third optical grooves, said first optical groove being spaced from said second optical groove a first distance, and said second optical groove being spaced from said third optical groove a second distance less than said first distance;
wherein said first optical groove has a first depth, said second optical groove has a second depth larger than said first depth, and said third optical groove has a third depth larger than said first and second depths; and
wherein said first optical groove has a first refracting surface oriented with respect to said light-emitting surface at a first angle, and said second optical groove has a second refracting surface oriented with respect to said light-emitting surface at a second angle different from said first angle.

* * * * *